(12) United States Patent  
Huang et al.

(10) Patent No.: US 8,248,343 B2  
(45) Date of Patent: Aug. 21, 2012

(54) LIQUID CRYSTAL DISPLAY PANEL AND METHOD FOR DRIVING PIXELS THEREOF

(75) Inventors: Chun-Wei Huang, Chiayi (TW); Pei-Yi Chen, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 393 days.

(21) Appl. No.: 12/568,688

(22) Filed: Sep. 29, 2009

(65) Prior Publication Data

US 2010/0315321 A1    Dec. 16, 2010

(30) Foreign Application Priority Data

Jun. 16, 2009    (TW) ................................ 98120093 A

(51) Int. Cl.  
*G09G 3/36*    (2006.01)

(52) U.S. Cl. .......................................... 345/89; 345/690

(58) Field of Classification Search ........................ None  
See application file for complete search history.

(56) References Cited

U.S. PATENT DOCUMENTS

| | | | |
|---|---|---|---|
| 8,111,226 B2 * | 2/2012 | Tsai et al. ....................... 345/92 |
| 2006/0262237 A1 | 11/2006 | Chen et al. |
| 2008/0024689 A1 | 1/2008 | Ahn |

* cited by examiner

*Primary Examiner* — Wayne Young  
*Assistant Examiner* — Brian Butcher  
(74) *Attorney, Agent, or Firm* — Jianq Chyun IP Office

(57) ABSTRACT

A liquid crystal display (LCD) panel and a method for driving pixels thereof are provided. The present invention uses a fixed voltage generated by a charge-sharing unit to perform charge-sharing with a second sub-pixel in a pixel, so as to make that the brightness of a second bright region corresponding to the second sub-pixel is darker than the brightness of a first bright region corresponding to a first sub-pixel in the pixel. Accordingly, the present invention can achieve the purpose of gray-levels space stacking without adding additional data lines and thus improving the color washout phenomenon of the LCD.

14 Claims, 5 Drawing Sheets ary, and are intended to provide further explanation of the invention as claimed.
LIQUID CRYSTAL DISPLAY PANEL AND METHOD FOR DRIVING PIXELS THEREOF

CROSS-REFERENCE TO RELATED APPLICATION

This application claims the priority benefit of Taiwan application serial no. 98120093, filed on Jun. 16, 2009. The entirety of the above-mentioned patent application is hereby incorporated by reference herein and made a part of specification.

BACKGROUND OF THE INVENTION

1. Field of the Invention

The present invention relates to a flat panel display technology, more particularly, to a liquid crystal display panel and a method for driving pixels thereof capable of improving the color washout phenomenon.

2. Description of the Related Art

As technologies in optoelectronics and semiconductors advance, flat panel displays also flourish accordingly. Among various flat panel displays, the liquid crystal display (LCD) has become the mainstream in the market because of its superior characteristics, such as high space utilization, low power consumption, no radiation and low electromagnetic disturbance. At present, some of the basic demands on the LCD include properties such as a high contrast ratio, rapid response and wide viewing angle. The technologies capable of providing a wide viewing angle include, for example, multi-domain vertical alignment (MVA), multi-domain horizontal alignment (MHA), twisted nematic plus wide viewing film (TN+film) and in-plane switching (IPS).

Although the LCD adopting the above-mentioned technologies can achieve the purpose of the wide viewing angle, but the color washout phenomenon is denounced by users. In general, the color washout phenomenon means that user would watch an image frame with different color tones when user watches the image frame displayed on the LCD by different viewing angles. For example, if user stands at an oblique viewing angle such as 60 degree to view the image frame displayed on the LCD, the color tone of the image frame watched by user is whiter than the color tone of the image frame watched by user standing at a direct viewing angle such as 90 degree.

Traditionally, in order to mitigate the color washout phenomenon appeared under large viewing angle of the LCD, a solution submitted by some display panel manufacturers is to divide each of the pixels within the LCD panel into two sub-pixels which may be independently driven (i.e. the 2D1G's display panel structure), and the color of one of the two sub-pixels displays higher gray level, and the color of another sub-pixel displays lower gray level. Therefore, after a color with a middle gray level may be obtained by mixing the color having higher gray level with the color having lower gray level (i.e. the concept of space stacking), user can watch an image frame with similar color tones regardless of user standing at an oblique viewing angle or an direct viewing angle to view the image frame displayed on the LCD.

However, since each the pixels within the LCD panel would be divided into two sub-pixels which may be independently driven, the number of the data lines within the LCD panel would be increased to double, such that the driving channels of the source driver also would be increased to double, and thus increasing the fabrication cost of the source driver.

SUMMARY OF THE INVENTION

The present invention is directed to a liquid crystal display and a method for driving pixels thereof capable of improving the color washout phenomenon without adding additional data lines.

The prevent invention provides a liquid crystal display (LCD) panel including a plurality of pixels arranged in an array. Each of the pixels is correspondingly coupled to a data line, a first scan line and a second scan line, and each of the pixels includes a first sub-pixel, a second sub-pixel and a charge-sharing unit. The first sub-pixel is coupled to the data line and the first scan line, and used for receiving display data through the data line to form a first bright region when the first scan line receives a first scan signal.

The second sub-pixel is coupled to the data line and the first scan line, and used for receiving the display data through the data line to form a second bright region when the first scan line receives the first scan signal. The charge-sharing unit is coupled to the second sub-pixel, the first scan line and the second scan line, and used for generating a fixed voltage when the first scan line receives the first scan signal, and providing the fixed voltage to perform charge-sharing with the second sub-pixel when the second scan line receives a second scan signal.

The prevent invention also provides a method for driving a pixel, wherein the pixel includes a first sub-pixel, a second sub-pixel and a charge-sharing unit. The first sub-pixel and the second sub-pixel are coupled to a data line and a first scan line; the charge-sharing unit is coupled to the second sub-pixel, the first scan line and a second scan line. The method includes the following steps of providing a first scan signal to the first scan line so as to make that the first sub-pixel and the second sub-pixel receive display data through the data line to form a first bright region and a second bright region, respectively, and make that the charge-sharing unit generates a fixed voltage; and providing a second scan signal to the second scan line so as to make that the charge-sharing unit provides the fixed voltage to perform charge-sharing with the second sub-pixel.

From the above, the present invention uses a fixed voltage generated by a charge-sharing unit to perform charge-sharing with a second sub-pixel in a pixel, so as to make that the brightness of a second bright region corresponding to the second sub-pixel is darker than the brightness of a first bright region corresponding to a first sub-pixel in the pixel. Accordingly, the present invention can achieve the purpose of gray-levels space stacking without adding additional data lines and thus improving the color washout phenomenon of the LCD.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
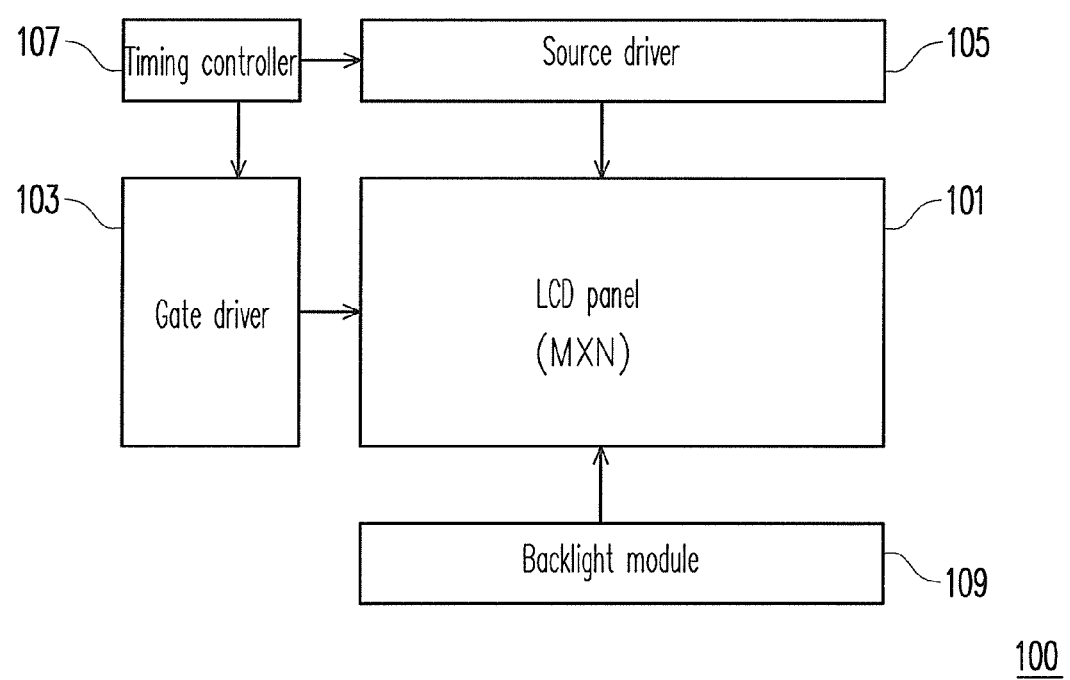
FIG. 1 is a system block diagram of a liquid crystal display 100 according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a system block diagram of a liquid crystal display (LCD) 100 according to an exemplary embodiment of the present invention. Referring to FIG. 1, the LCD 100 includes a LCD panel 101, a gate driver 103, a source driver 105, a timing controller 107 and a backlight module 109. The LCD panel includes a plurality of pixels arranged in an array and represented as M*N shown in FIG. 1. The gate driver 103 is coupled to the LCD panel 101 and used for sequentially outputting a scan signal to one-by-one turn on each of pixel rows within the LCD panel 101.

The source driver 105 is couple to the LCD panel 101, and used for correspondingly providing display data (also can be called the pixel data) to the pixel row turned on by the gate driver 103. The timing controller 107 is coupled to the gate driver 103 and the source driver 105, and used for controlling the operations of the gate driver 103 and the source driver 105. The backlight module 109 is used for providing the backlight source required by the LCD panel 101.

Herein, in order to clearly explain that how the color washout phenomenon of LCD can be improved without adding addition data lines. The pixels within the LCD panel would be described in below.

Figure 2:
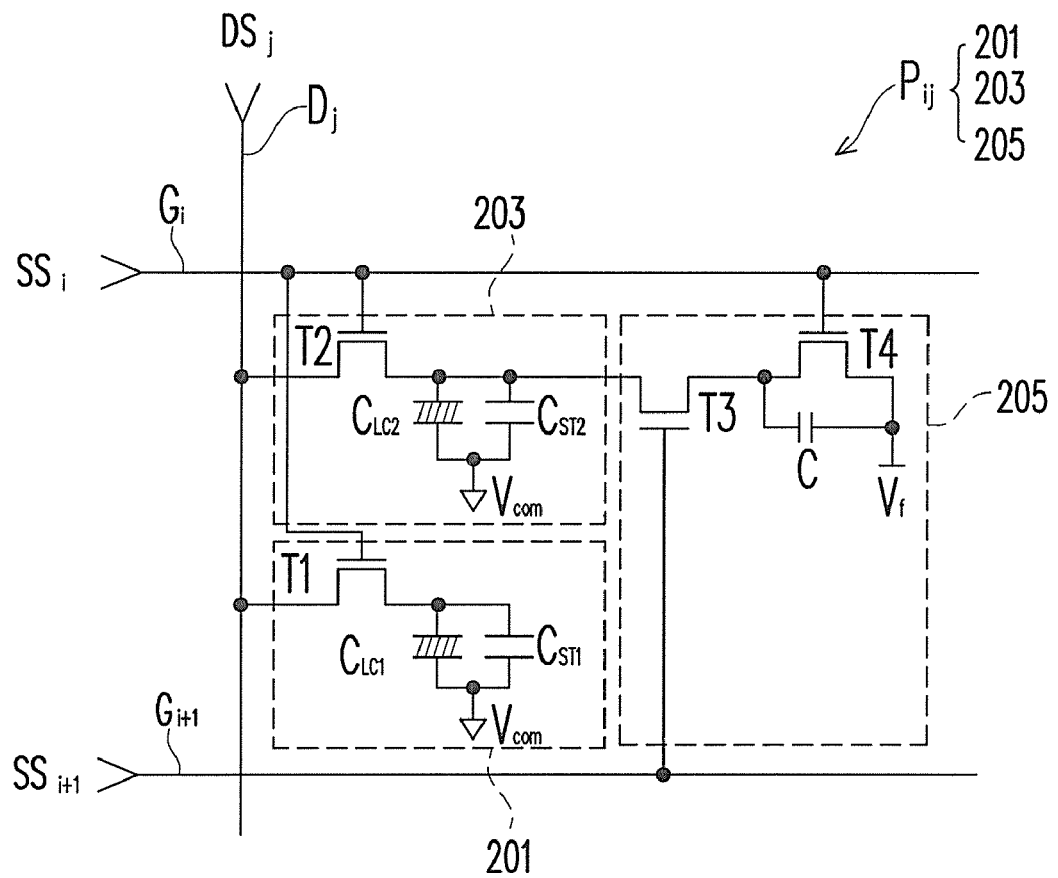
FIG. 2 is an equivalent circuit diagram of a pixel Pij in the $i^{th}$ row and $j^{th}$ column of the liquid crystal display panel 101 according to an exemplary embodiment of the present invention.

FIG. 2 is an equivalent circuit diagram of a pixel Pij in the $i^{th}$ row and $j^{th}$ column of the LCD panel 101 according to an exemplary embodiment of the present invention, where i and j are positive integers. Referring to FIGS. 1 and 2, the pixel Pij is coupled to a data line Dj and two scan lines Gi and Gi+1. The pixel Pij includes two sub-pixels 201 and 203 and a charge-sharing unit 205. In the exemplary embodiment, the sub-pixel 201 is coupled to the data line Dj and the scan line Gi, and used for receiving display data DSj provided by the source driver 105 through the data line Dj to form a first bright region when the scan line Gi receives a scan signal SSi outputted from the gate driver 103.

To be specific, the sub-pixel 201 includes an active device T1 (for example, thin film transistor), a liquid crystal capacitor $C_{LC1}$, and a storage capacitor $C_{ST1}$. The gate of the active device T1 is coupled to the scan line Gi, and the source of the active device T1 is coupled to the data line Dj. The liquid crystal capacitor $C_{LC1}$ and the storage capacitor $C_{ST1}$ are coupled in parallel and coupled between the drain of the active device T1 and a common voltage Vcom.

In addition, the sub-pixel 203 is coupled to the data line Dj and the scan line Gi, and used for receiving the display data DSj provided by the source driver 105 through the data line Dj to form a second bright region when the scan line Gi receives the scan signal SSi outputted from the gate driver 103. To be specific, the sub-pixel 203 includes an active device T2 (for example, thin film transistor), a liquid crystal capacitor $C_{LC2}$, and a storage capacitor $C_{ST2}$. The gate of the active device T2 is coupled to the scan line Gi, and the source of the active device T2 is coupled to the data line Dj. The liquid crystal capacitor $C_{LC2}$ and the storage capacitor $C_{ST2}$ are coupled in parallel and coupled between the drain of the active device T2 and the common voltage Vcom.

Furthermore, the charge-sharing unit 205 is coupled to the sub-pixel 203 and the scan lines Gi and Gi+1, and used for generating a fixed voltage Vf when the scan line Gi receives the scan signal SSi outputted from the gate driver 103, and providing the fixed voltage Vf to perform charge-sharing with the sub-pixel 203 when the scan line Gi+1 receives a scan signal SSi+1 outputted from the gate driver 103.

To be specific, the charge-sharing unit 205 includes two active devices T3 and T4 (for example, thin film transistors) and a capacitor C. The gate of the active device T3 is coupled to the scan line Gi+1, and the source of the active device T3 is coupled to the drain of the active device T2. The gate of the active device T4 is coupled to the scan line Gi, the source of the active device T4 is coupled to the drain of the active device T3, and the drain of the active device T4 is coupled to the fixed voltage Vf. The capacitor C is coupled between the source and the drain of the active device T4.

In the exemplary embodiment, the fixed voltage Vf may equal to or may not equal to the common voltage Vcom, and the size (i.e. channel width/length ratio) of the active devices T3 and T4 may equal to or smaller than the size of the active devices T1 and T2. Accordingly, when the size of the active devices T3 and T4 is greatly smaller than the size of the active devices T1 and T2, the active devices T3 and T4 do not greatly influence the aperture ratio of the pixel Pij.

From the above, since gate driver 103 would sequentially output the scan signals SSi and SSi+1 to the scan lines Gi and Gi+1, so that when the scan line Gi receives the scan signal SSi outputted from the gate driver 103, the active devices T1 and T2 are turned on at this time. Accordingly, the sub-pixels 201 and 203 would simultaneously receive the display data DSj provided by the source driver 105 through the data line Dj to charge the liquid crystal capacitors $C_{LC1}$ and $C_{LC2}$ and the storage capacitors $C_{ST1}$ and $C_{ST2}$, and thus making that the sub-pixels 201 and 203 are respectively formed as the first bright region and the second bright region. At this time, the brightness of the first bright region and the second bright region is substantially the same. In addition, since the active device T4 is also turned on at this time, so that the capacitor C would store the charges of the fixed voltage Vf therein, and thus making that the charge-sharing unit 205 generates the fixed voltage Vf.

Next, when the scan line Gi+1 receives the scan signal SSi+1 outputted from the gate driver 103, only the active device T3 is turned on at this time, so that the sub-pixel 203 and the charge-sharing unit 205 would perform charge-sharing, namely, the charges stored in the liquid crystal capacitor $C_{LC2}$ and the storage capacitor $C_{ST2}$ would perform charge-sharing with the charges stored in the capacitor C. Accordingly, the brightness of the second bright region corresponding to the sub-pixel 203 is darker than the brightness of the first bright region corresponding to the sub-pixel 201. Therefore, the present invention can achieve the purpose of gray-levels space stacking without adding additional data lines and thus improving the color washout phenomenon of the LCD 100.

It should be noted that, during each frame period of the LCD 100, since the charges stored in the capacitor C would be firstly updated to the fixed voltage Vf and then perform charge-sharing with the sub-pixel 203. Accordingly, during the current frame period of the LCD 100, the capacitor C would not remain the charges generated during the previous frame period of the LCD 100 to influence the accuracy of performing charge-sharing with the sub-pixel 203.

Figure 3A:
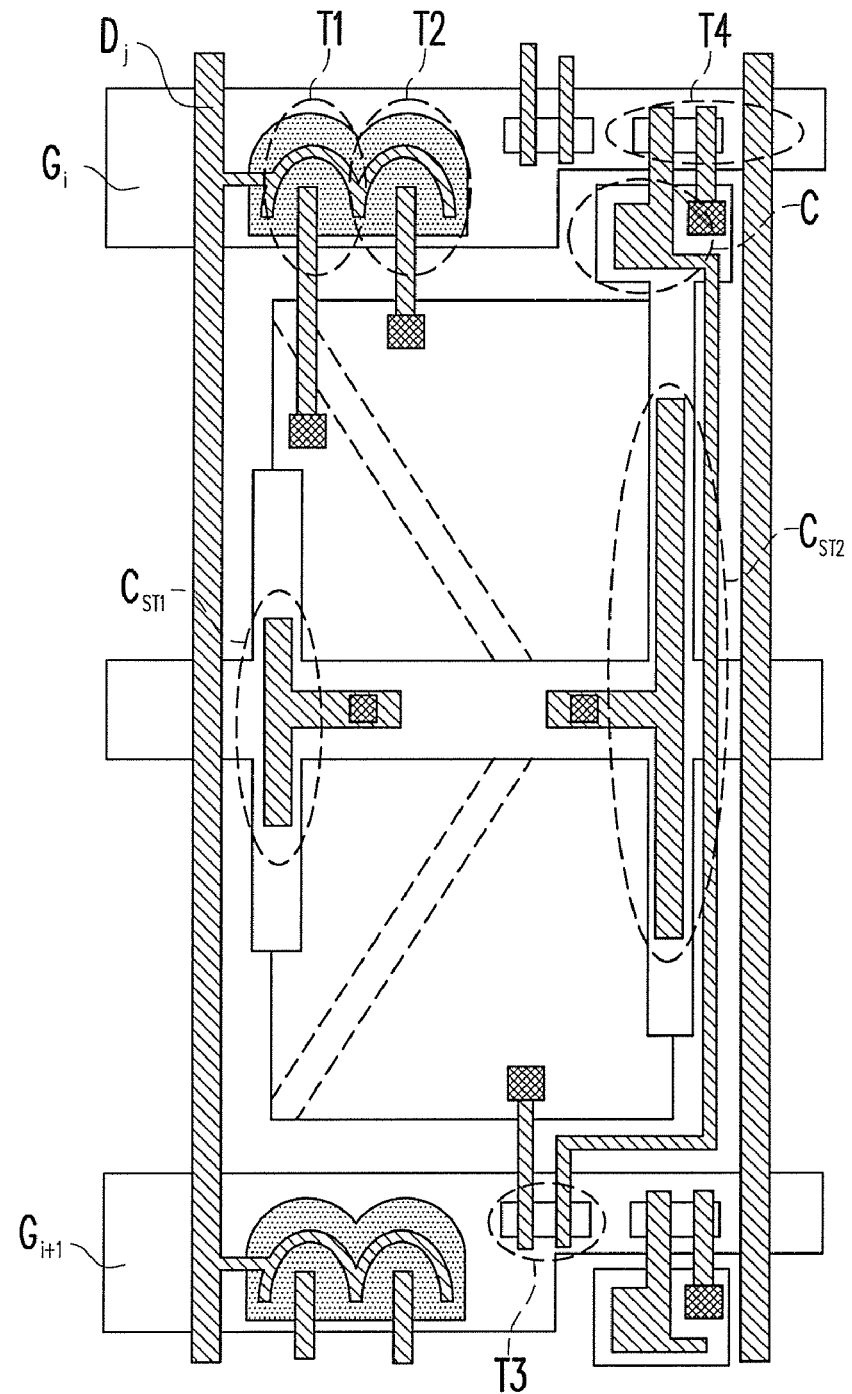
FIGS. 3A and 3B are respectively a layout diagram of the pixel Pij shown in FIG. 2 according to an exemplary embodiment of the present invention.
Figure 3B:
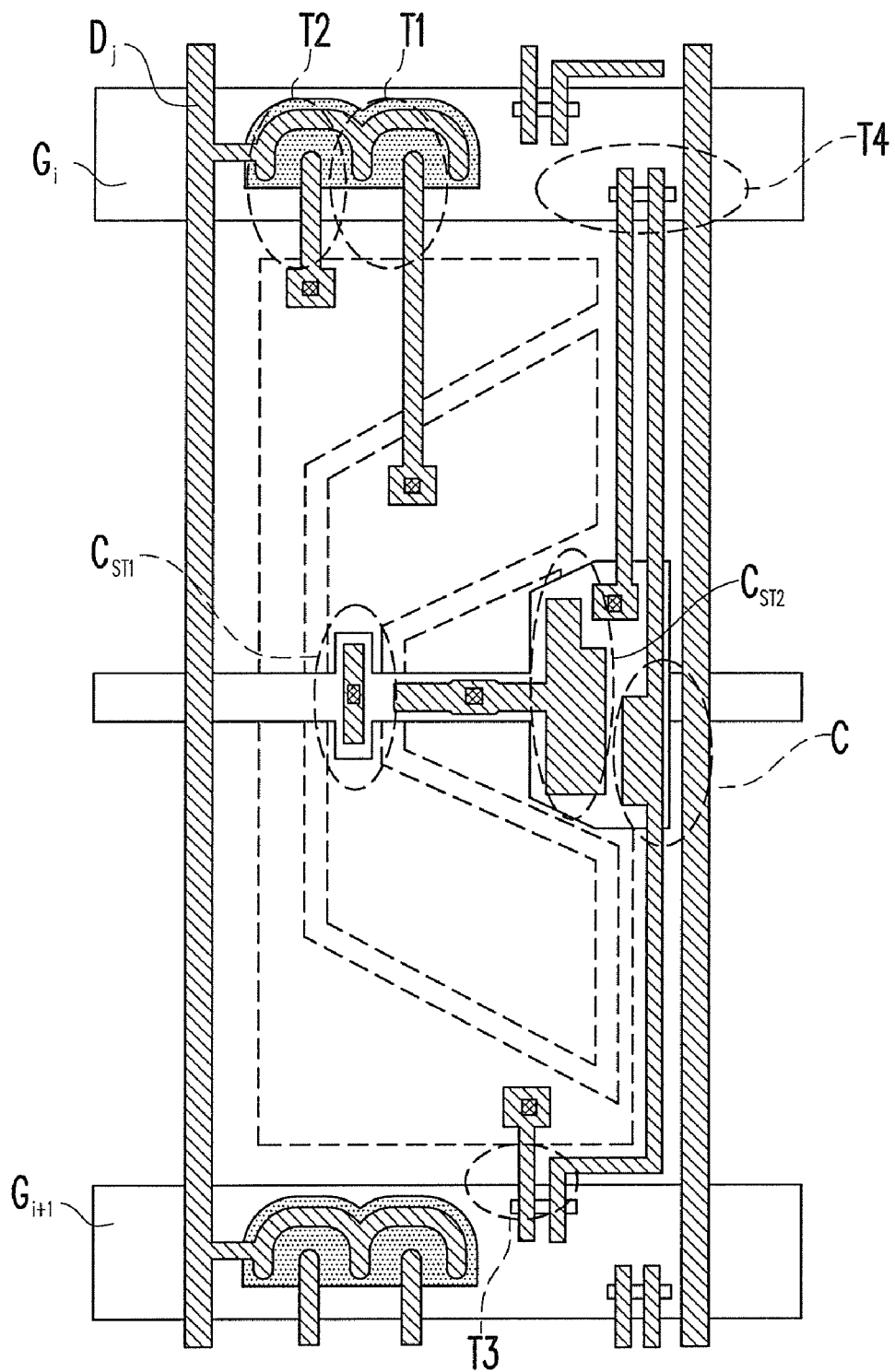

In addition, FIGS. 3A and 3B are respectively a layout diagram of the pixel Pij shown in FIG. 2 according to an exemplary embodiment of the present invention, but the layout diagrams shown in FIGS. 3A and 3B are only two kinds of implementation types for the pixel Pij, and the present invention is not limited these two kinds of implementation types for the Pij in practical. In other words, other layout manners for implementing the equivalent circuit of the pixel Pij shown in FIG. 2 are falling in the scope of the present invention.

In accordance with the above exemplary embodiments, a method for driving a pixel is summarized in below.

Figure 4:
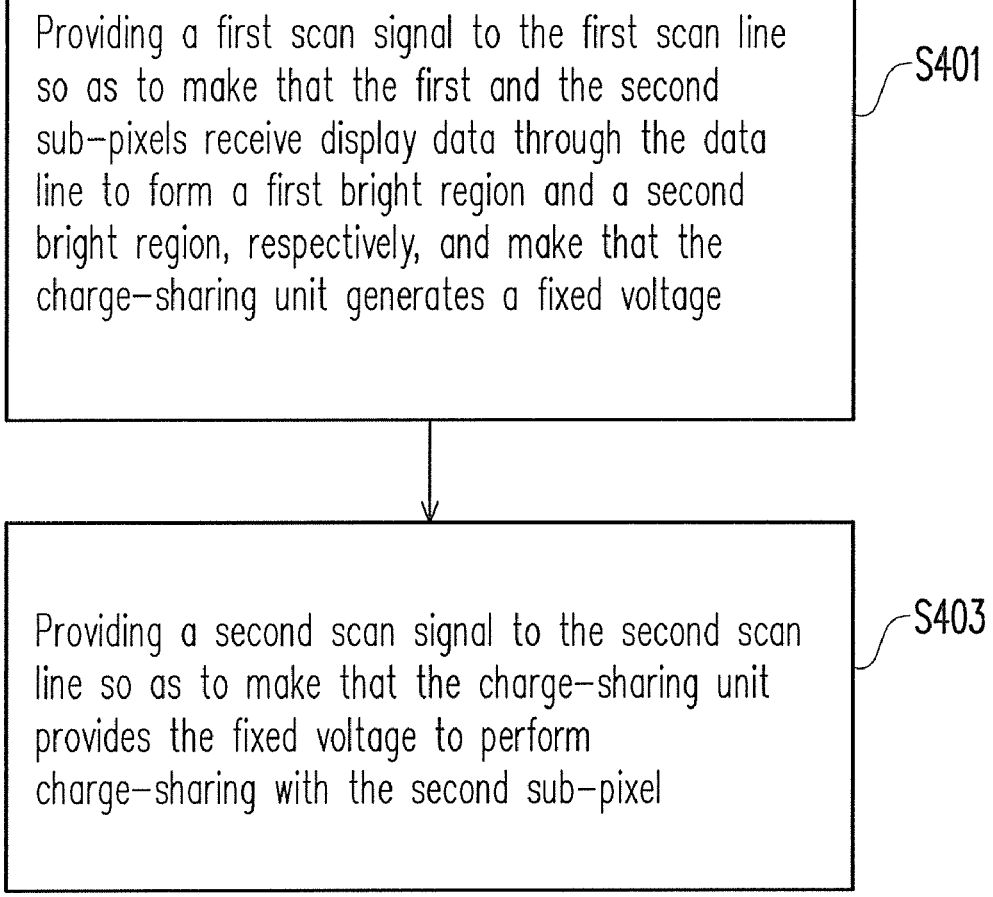
FIG. 4 is a flow chart of a method for driving a pixel according to an exemplary embodiment of the present invention.

FIG. 4 is a flow chart of a method for driving a pixel according to an exemplary embodiment of the present invention. Referring to FIG. 4, the method is suitable for a pixel including a first sub-pixel, a second sub-pixel and a charge-sharing unit, wherein the first and the second sub-pixels are coupled to a data line and a first scan line, and the charge-sharing unit is coupled to the second sub-pixel, the first scan line and a second scan line.

The method includes the following steps of providing a first scan signal to the first scan line so as to make that the first and the second sub-pixels receive display data through the data line to form a first bright region and a second bright region, respectively, and make that the charge-sharing unit generates a fixed voltage (Step S401), wherein the fixed voltage may equal to or may not equal to a common voltage of a liquid crystal display (LCD) panel; and providing a second scan signal to the second scan line so as to make that the charge-sharing unit provides the fixed voltage to perform charge-sharing with the second sub-pixel (Step S403). In the exemplary embodiment, the charge-sharing unit performs charge-sharing with the second sub-pixel when the second scan signal is enabled, but the charge-sharing unit is terminated to perform charge-sharing with the second sub-pixel when the second scan signal is disabled.

In summary, the present invention uses a fixed voltage generated by a charge-sharing unit to perform charge-sharing with a second sub-pixel in a pixel, so as to make that the brightness of a second bright region corresponding to the second sub-pixel is darker than the brightness of a first bright region corresponding to a first sub-pixel in the pixel. Accordingly, the present invention can achieve the purpose of gray-levels space stacking without adding additional data lines and thus improving the color washout phenomenon of the LCD.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
a plurality of pixels arranged in an array, each of the pixels being correspondingly coupled to a data line, a first scan line and a second scan line, each of the pixels comprising:
a first sub-pixel, coupled to the data line and the first scan line, for receiving display data through the data line to form a first bright region when the first scan line receives a first scan signal;
a second sub-pixel, coupled to the data line and the first scan line, for receiving the display data through the data line to form a second bright region when the first scan line receives the first scan signal; and
a charge-sharing unit, only coupled to the second sub-pixel, the first scan line and the second scan line, for generating a fixed voltage when the first scan line receives the first scan signal, and only providing the fixed voltage to perform charge-sharing with the second sub-pixel when the second scan line receives a second scan signal, so as to reduce a brightness of the second bright region and maintain a brightness of the first bright region,
wherein the charge-sharing unit generates the fixed voltage whenever the first scan line receives the first scan signal.

2. The LCD panel according to claim 1, wherein the first sub-pixel comprises:
a first active device having a gate coupled to the first scan line and a source coupled to the data line; and
a first liquid crystal capacitor and a first storage capacitor, both coupled in parallel and coupled between a drain of the first active device and a common voltage.

3. The LCD panel according to claim 2, wherein the second sub-pixel comprises:
a second active device having a gate coupled to the first scan line and a source coupled to the data line; and
a second liquid crystal capacitor and a second storage capacitor, both coupled in parallel and coupled between a drain of the second active device and the common voltage.

4. The LCD panel according to claim 3, wherein the charge-sharing unit comprises:
a third active device having a gate coupled to the second scan line and a source coupled to the drain of the second active device;
a fourth active device having a gate coupled to the first scan line, a source coupled to a drain of the third active device, and a drain coupled to the fixed voltage; and
a capacitor coupled between the source and the drain of the fourth active device.

5. The LCD panel according to claim 4, wherein the fixed voltage is equal to the common voltage.

6. The LCD panel according to claim 4, wherein the fixed voltage is not equal to the common voltage.

7. The LCD panel according to claim 4, wherein the size of the third and the fourth active devices is equal to or smaller than the size of the first active device.

8. The LCD panel according to claim 4, wherein the size of the third and the fourth active devices is equal to or smaller than the size of the second active device.

9. The LCD panel according to claim 4, wherein the first, the second, the third and the fourth active devices are a thin film transistor (TFT) respectively.

10. A method for driving a pixel, the pixel comprising a first sub-pixel, a second sub-pixel and a charge-sharing unit, the first sub-pixel and the second sub-pixel being coupled to a data line and a first scan line, the charge-sharing unit being only coupled to the second sub-pixel, the first scan line and a second scan line, the method comprising:
providing a first scan signal to the first scan line, so as to make that the first sub-pixel and the second sub-pixel receive display data through the data line to form as a first bright region and a second bright region, respectively, and make that the charge-sharing unit generates a fixed voltage; and providing a second scan signal to the second scan line, so as to make that the charge-sharing unit only provides the fixed voltage to perform charge-sharing with the second sub-pixel, and thus reducing a brightness of the second bright region and maintaining a brightness of the first bright region, wherein the charge-sharing unit generates the fixed voltage whenever the first scan line receives the first scan signal.

11. The method according to claim 10, wherein the charge-sharing unit performs charge-sharing with the second sub-pixel when the second scan signal is enabled.

12. The method according to claim 10, wherein the charge-sharing unit is terminated to perform charge-sharing with the second sub-pixel when the second scan signal is disabled.

13. The method according to claim 10, wherein the fixed voltage is equal to a common voltage of a liquid crystal display (LCD) panel.

14. The method according to claim 10, wherein the fixed voltage is not equal to the common voltage of an LCD panel.

* * * * *